Feb. 4, 1930. J. SUTTON 1,746,092
HARROW
Filed Aug. 13, 1928
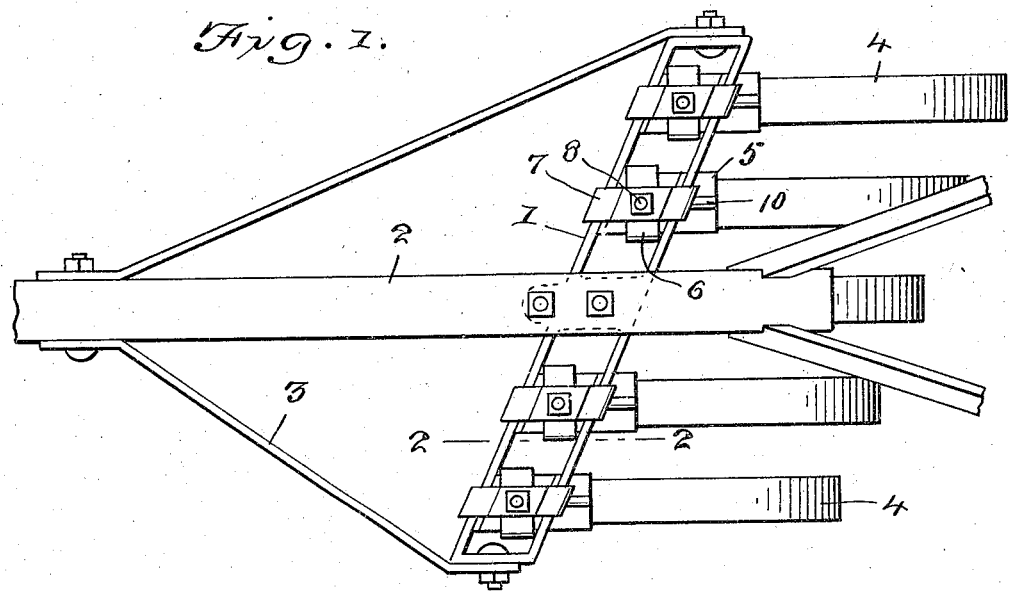
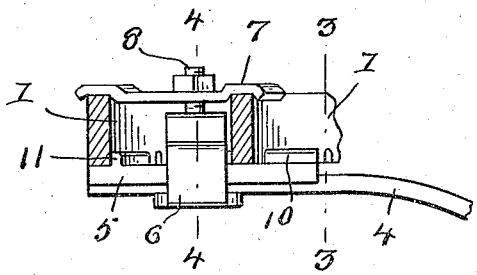 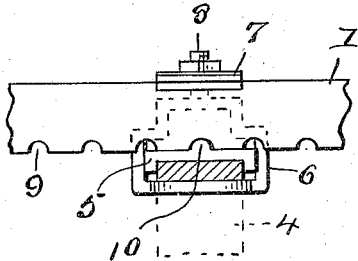
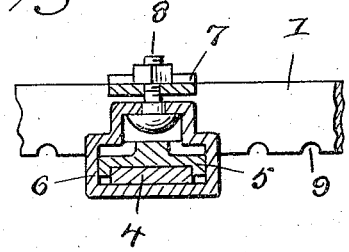 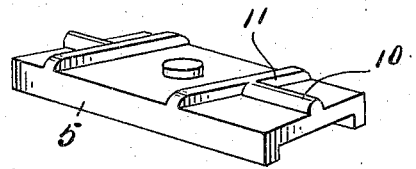
Jesse Sutton INVENTOR
BY Victor J. Evans ATTORNEY Patented Feb. 4, 1930

1,746,092

UNITED STATES PATENT OFFICE

JESSE SUTTON, OF SILVER CREEK, MISSISSIPPI

HARROW

Application filed August 13, 1928. Serial No. 299,420.

This invention relates to improvements in harrows, the general objects of the invention being to provide means for detachably and adjustably connecting the teeth of the harrow to the frame thereof so that the teeth can be placed at different distances apart and can be removed whenever desired.

This invention also consists in certain other features of construction and in combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a plan view of the improved harrow.

Figure 2 is a section on line 2—2 of Figure 1.

Figure 3 is a section on line 3—3 of Figure 2.

Figure 4 is a section on line 4—4 of Figure 2.

Figure 5 is a perspective view of one of the channel members.

In the drawing, the numeral 1 indicates a frame of substantially rectangular shape which is bolted at its center to the beam 2, the frame extending diagonally to the beam, with its ends connected to the beam by the braces 3. The spring teeth of the harrow are shown at 4, and each tooth has its upper end engaging the channel part of a channel-shaped member 5 which is placed in the lower part of a small casing 6, the member 5 being of considerably greater length than the casing. Each casing extends within the frame 1 and is attached to a plate or cross piece 7 by a bolt 8, the plates bridging the frame 1 and having their ends recessed to receive the upper edges of the two side bars or side pieces of said frame. The lower edges of said side pieces are formed with curved notches 9, and each channel-shaped member is formed with a rounded rib 10 at each end thereof on its top, one of these ribs engaging a notch in one of the side pieces and the other rib engaging a notch in the other side piece. A pair of transversely extending flanges 11 is formed on the top of each channel member and these flanges engage the inner walls of the frame 1 to prevent endwise movement of the channel member, as clearly shown in Figures 2 and 4.

Thus it will be seen that when the upper end of the tooth is placed between the channel-shaped member and the lower part of the casing 6 and the nut of the bolt 8 tightened, the casing will be moved upwardly so as to cause the ribs 10 of the channel-shaped member to engage a pair of the notches 9 in the cross frame 1, when further movement of the nut will cause the casing to clamp the tooth in the channel-shaped member. By providing a plurality of these notches 9, the holding means for the teeth of the harrow can be adjusted toward and away from each other so as to adjust the spaces between the teeth and by loosening the nuts on the bolts 8, the clamping action between the casings and channel-shaped members can be lessened so that the teeth can be removed.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. An implement of the class described comprising a cross frame, including two side bars, said bars having notches in their lower edges, a plurality of channel-shaped members, a casing in the lower part of which each channel-shaped member is placed, the upper part of each casing extending into the space formed by the frame, means for supporting the casing from the frame, ribs on the channel-shaped members engaging the notches in the side bars of the frame and teeth having portions clamped between the channel-shaped members and their casings.

2. An implement of the class described comprising a cross frame, including two side bars, said bars having notches in their lower edges, a plurality of channel-shaped members, a casing in the lower part of which each channel-shaped member is placed, the upper part of each casing extending into the space formed by the frame, means for supporting the casing from the frame, ribs on the channel-shaped members engaging the notches in the side bars of the frame, teeth having portions clamped between the channel-shaped members and their casings and flanges on the channel-shaped members engaging the interior walls of the frame for preventing longitudinal movement of the channel members.

3. An implement of the class described comprising a cross frame including a pair of side bars having notches in their lower edges, a plurality of casings extending into the space formed by the frame, cross pieces bridging the space and resting upon the upper edges of the side bars, bolts for connecting each casing with a cross piece, a channel-shaped member passing through each casing, ribs on the top of each channel-shaped member engaging a pair of notches in the frame, a toothed member having a part engaging each channel-shaped member and clamped therein by the casing and a pair of transverse flanges on each channel-shaped member for engaging the inner sides of the side pieces for preventing longitudinal movement of each channel-shaped member.

In testimony whereof, I affix my signature.

JESSE SUTTON.